No. 616,967. Patented Jan. 3, 1899.
C. H. PRESCOTT.
DEVICE FOR PUTTING RUBBER TIRES ON CARRIAGE WHEELS.
(Application filed Oct. 20, 1897. Renewed Nov. 28, 1898.)
(No Model.) 2 Sheets—Sheet 1.
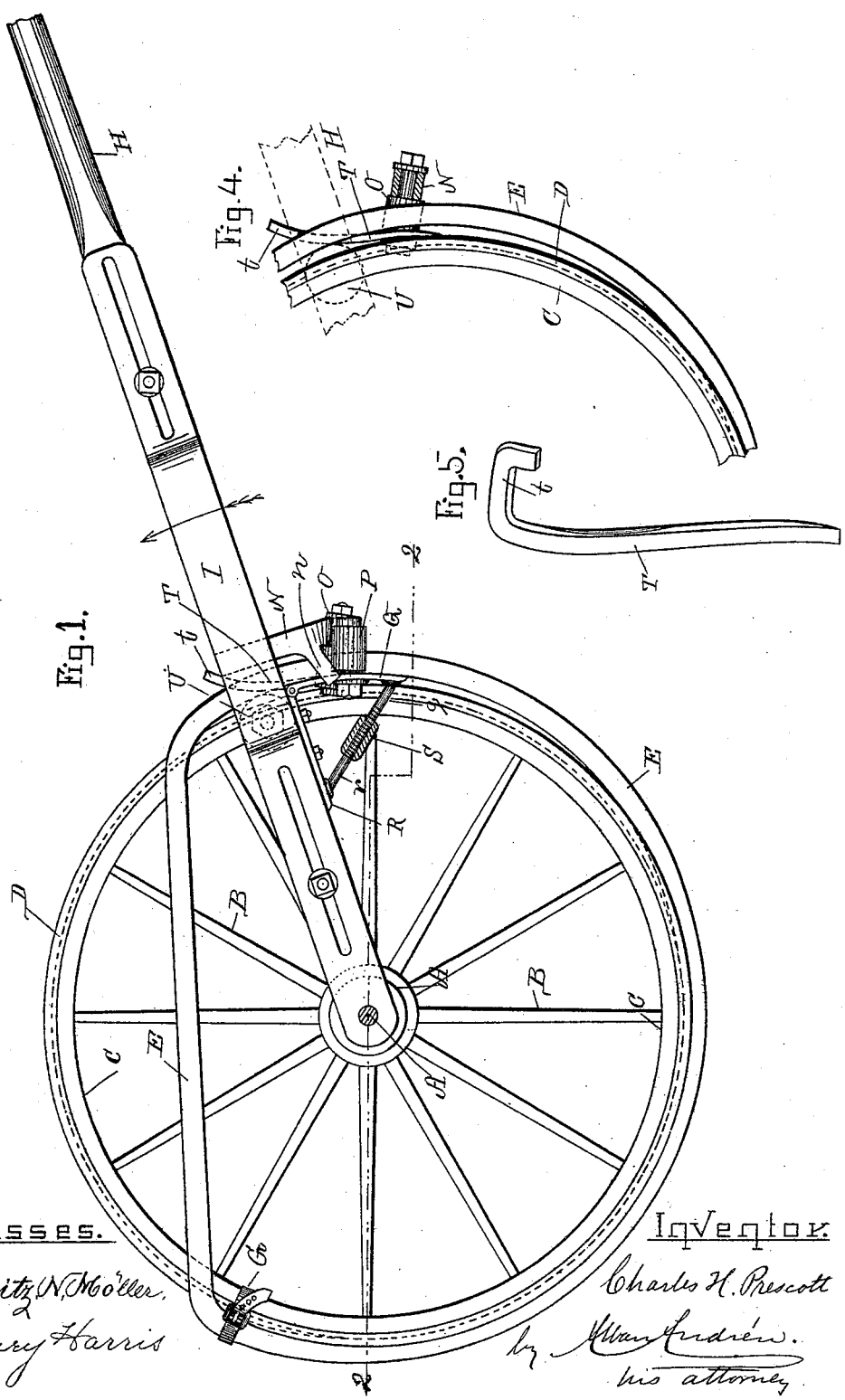
Witnesses.
Lauritz N. Möller.
Sydney Harris
Inventor
Charles H. Prescott
by Alban Andrew
his attorney

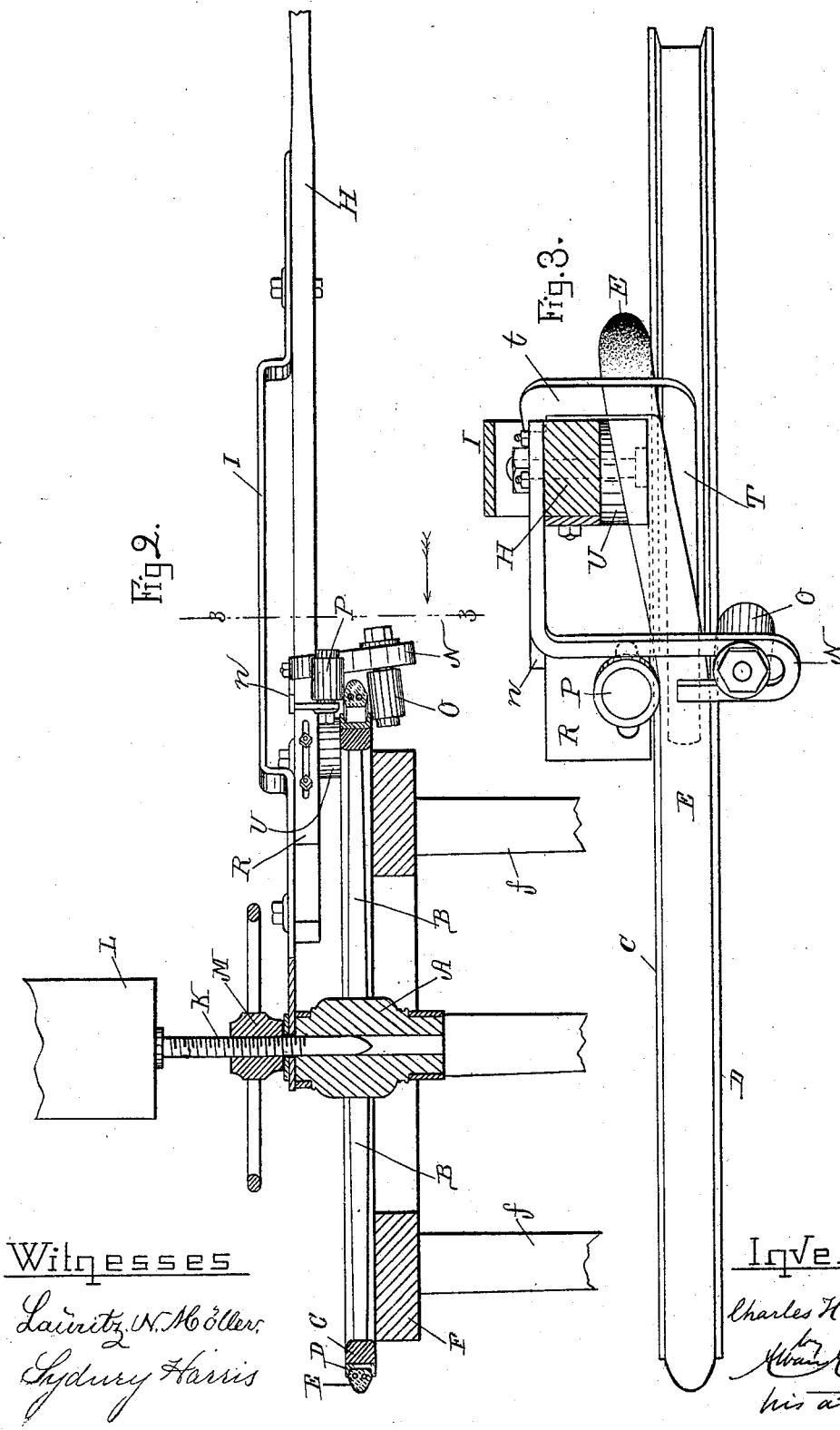

UNITED STATES PATENT OFFICE.

CHARLES H. PRESCOTT, OF AMESBURY, MASSACHUSETTS, ASSIGNOR TO THE BIDDLE & SMART COMPANY, OF SAME PLACE.

DEVICE FOR PUTTING RUBBER TIRES ON CARRIAGE-WHEELS.

SPECIFICATION forming part of Letters Patent No. 616,967, dated January 3, 1899.

Application filed October 20, 1897. Renewed November 28, 1898. Serial No. 697,713. (No model.)

*To all whom it may concern:*

Be it known that I, CHARLES H. PRESCOTT, a citizen of the United States, and a resident of Amesbury, in the county of Essex and State of Massachusetts, have invented new and useful Improvements in Devices for Putting Rubber Tires on Carriage-Wheels, of which the following, taken in connection with the accompanying drawings, is a specification.
This invention relates to improvements in devices for putting rubber tires on carriage-wheels, and it is carried out as follows, reference being had to the accompanying drawings, wherein—
Figure 1 represents a top plan view of the invention, showing it in position for putting a rubber tire on a wheel. Fig. 2 represents a cross-section on the line 2 2, shown in Fig. 1. Fig. 3 represents an enlarged cross-section on the line 3 3, shown in Fig. 2. Fig. 4 represents a detail top plan view showing the guide-lever removed; and Fig. 5 represents a perspective view of the detachable guiding and supporting wedge, as will hereinafter be more fully shown and described.

In the drawings, A represents the hub of the wheel.

B B represent the spokes, and C represents the felly, as usual.
D represents the grooved metal rim secured to the outside of the felly C, as is common in rubber-tired wheels.

E represents the rubber tire which is to be attached to the rim D.
In carrying out my invention I support the wheel on a base or platform F, preferably attached to legs *f f*, as shown.

Previous to putting the rubber tire on the wheel it is laid by hand on a portion of the circumference of the latter and secured to the wheel by means of a strap G or other suitable fastening device, as shown in Fig. 1.

H is the tire-laying lever, to which is secured the longitudinally-adjustable plate I, the inner end of which is pivoted to the hub A by means of a centering-spindle K, which passes through a perforation in the plate I and the central perforation in the hub A, as shown in Fig. 1.

Above the wheel is arranged a suitable fixed support L, against which the upper end of the spindle K is supported. The spindle K is screw-threaded and provided with a screw-threaded hand-wheel M, working on the screw-threaded spindle K, and by this means the wheel is firmly secured onto the support F simply by turning the hand-wheel M around the screw-threaded spindle K.

By means of the longitudinally-adjustable plate I, adjustable on the lever H, the device may be used on wheels of varying diameters, large or small, as circumstances may require.

To the lever H is secured a downwardly-projecting bracket N, in which is adjustably journaled a roller O, which serves as a lower support for guiding the rubber tire E into the grooved rim D during the process of putting the rubber tire on the wheel.

During the process of putting the rubber tire on the wheel the said tire is guided between the lower roller O and an upper roller P, journaled on a pin or spindle secured in a bracket Q, preferably hinged to a plate R, secured to the lever H, as shown in Figs. 1 and 2. The bracket Q is made adjustable on its pivotal connection to the plate R by means of a right-and-left threaded nut S, adjustable on correspondingly right-and-left threaded bolts *q r*, secured to the respective bracket and plate Q R, as shown in Fig. 1.

By adjusting the position of the bracket Q relative to the lever H the device may be useful for wheels of smaller or larger sizes.

In practice I make on the bracket N a side lip or projection *n*, adapted to rest on top of the bracket Q, which projection serves as a rest against the upward pressure on the roller P to prevent its spreading upward away from the lower roller O during the process of putting the rubber tire on the wheel.

On the under side of the lever H is journaled a roller U, which serves to spread the tire outward during the process of putting the tire on the wheel, which is necessary for the purpose of stretching the rubber tire sufficiently outward to enable it to be passed beyond the edge of the tire-receiving rim D before laying the tire in said grooved rim.

For the purpose of preventing the rubber tire from being twisted during the operation of putting it on the carriage-wheel I use a detachable guide-wedge T, adapted to be inserted between the grooved rim D and the under side of the rubber tire E, as shown in Figs. 4 and 5, said wedge having a hooked end $t$, adapted to be hooked onto the lever H during the operation of putting the tire on the wheel, as shown in Figs. 1, 3, 4 and 5.

The operation is as follows: After the wheel has been secured in place on the support F the rubber tire E is suitably secured at one portion of the wheel by means of a strap G or other suitable fastening device. About one-half of the rubber tire is then laid by hand in the grooved rim D, as shown in Fig. 1. The pin K is inserted in the perforation in the bar I of the lever H and central perforation of the wheel-hub A, after which the wheel M is turned so as to hold the wheel firmly in place on the support F. After the rubber tire has been placed between the rollers O P and the wedge T inserted between the grooved rim D and tire E the lever H is swung in the direction of the arrow shown in Fig. 1, causing the rubber tire to be guided properly and laid in the grooved rim D, and when properly laid therein the wedge T is withdrawn, the pressure-wheel M is released from the plate I and hub of the wheel, after which the latter is removed from the support F and another wheel put on said support to be provided with a rubber tire, and so on during the operation of the machine.

Having thus fully described the nature, construction, and operation of my invention, I wish to secure by Letters Patent and claim—

1. In a device for putting rubber tires on carriage-wheels, a support for said wheel and a screw-threaded centering-spindle K, adapted to enter a central recess in the hub of the wheel, and a screw-threaded pressure-wheel M, combined with a lever H, having adjustably screwed thereto a plate I, pivoted on said spindle K, a pair of upper and lower guide-rollers P, O, journaled in bearings in said lever, and an expander-roller U, substantially as and for the purpose set forth.

2. In a device for putting rubber tires on carriage-wheels, a support for the wheel combined with a lever pivotally connected to the hub thereof and having upper and lower guide-rollers, an expander-roller and a removable wedge-bar T, for preventing the twisting of the tire during the process of laying it in the grooved rim of the wheel substantially as and for the purpose set forth.

In testimony whereof I have signed my name to this specification, in the presence of two subscribing witnesses, on this 25th day of June, A. D. 1897.

CHARLES H. PRESCOTT.

Witnesses:
SYLVESTER H. WIGGIN,
THOMAS W. LANE.